United States Patent [19]

Hashimoto

[11] 4,351,555
[45] Sep. 28, 1982

[54] FOLDABLE PANEL FOR AN AUTOMOTIVE VEHICLE

[75] Inventor: Akihiro Hashimoto, Kokubunji, Japan

[73] Assignee: Nissan Motor Company, Limited, Yokohama, Japan

[21] Appl. No.: 41,771

[22] Filed: May 23, 1979

[30] Foreign Application Priority Data

May 31, 1978 [JP] Japan ................................ 53-65178

[51] Int. Cl.³ .............................................. B60R 5/04
[52] U.S. Cl. .................................. 296/37.16; 16/366; 49/400; 220/334
[58] Field of Search ................ 296/37.16, 37.8, 24 R, 296/100, 101; 49/382, 402; 220/334; 16/150, 163, 166, 165

[56] References Cited

U.S. PATENT DOCUMENTS 2,440,817  5/1948  Benson ................................. 16/165
3,291,520 12/1966  Smith ................................ 296/24 R
3,476,432 11/1969  Aliment et al. .............. 296/37.16 X
4,127,301 11/1978  Syrowik ........................... 296/37.16
4,210,361  7/1980  Marvin et al. .................. 296/100 X

FOREIGN PATENT DOCUMENTS 191752  9/1957  Austria ............................. 296/37.16
2123462  1/1972  Fed. Rep. of Germany ... 296/37.16
1508091  1/1968  France .
1573884  6/1969  France ............................. 296/37.16
295870  4/1949  Switzerland .................... 296/37.16

Primary Examiner—Robert R. Song

[57] ABSTRACT

The present invention relates to a foldable panel for an automotive vehicle in which two plates are interconnected via hinge pins each having two parallel spindles which are respectively rotatably received in cylindrical envelopes formed in reinforcing members fixedly attached to the plates. The arrangement allows the two plates to be folded together in a manner that the upper layer of the panel is always smoothly folded with a single fold without the tendency of multiple folding induced by normal hinges and can be unfolded to a flat bulge free configuration across the line of folding.

5 Claims, 10 Drawing Figures

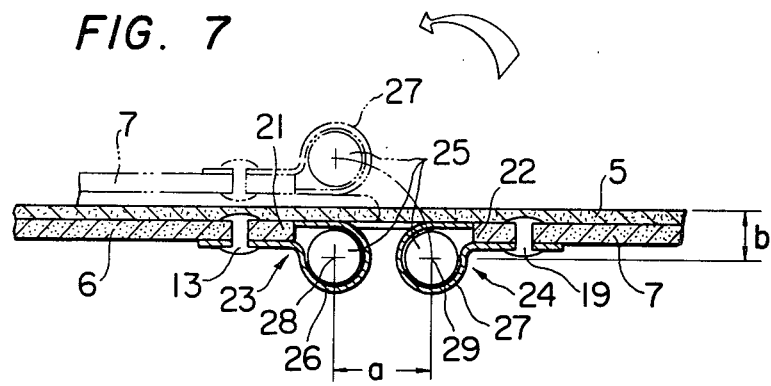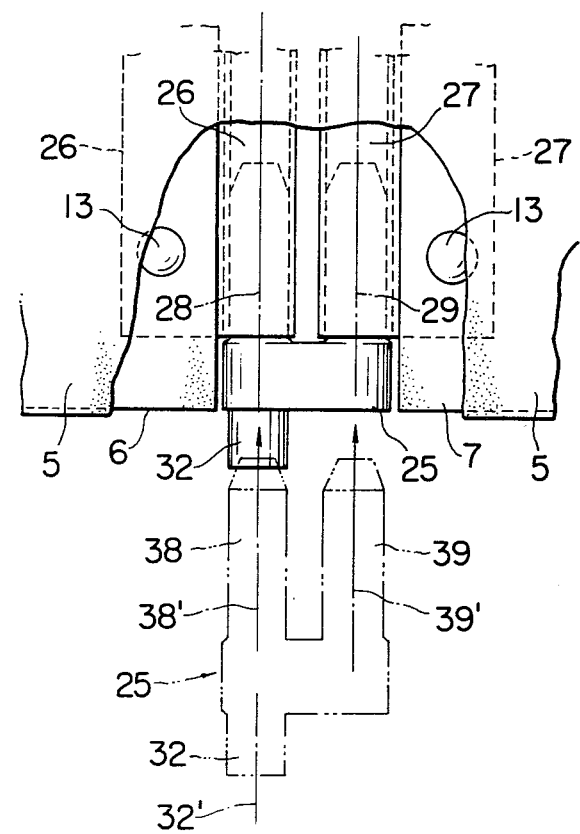

FOLDABLE PANEL FOR AN AUTOMOTIVE VEHICLE

FIELD OF THE INVENTION

The present invention relates to automotive vehicles and more particularly to a foldable panel which can be used as a floor cover for a luggage compartment or a partition and shelf for same.

BRIEF DESCRIPTION OF THE DRAWINGS

The objects, features and advantages of the present invention will become apparent as the description of the prior art arrangements and the preferred embodiments of the present invention are made in connection with the drawings in which:

FIG. 7 is a cross sectional view taken along section line VII—VII of FIG. 6, FIG. 8 is a partially cut away view of the portion of the foldable panel generally indicated by VIII in FIG. 6.

DESCRIPTION OF THE PRIOR ART

A number of foldable panels which act as shelves or floor covers for the luggage compartment of the vehicle have been proposed but have suffered from a rather short life due to the design of the hinge section of the panel.

Figure 4:
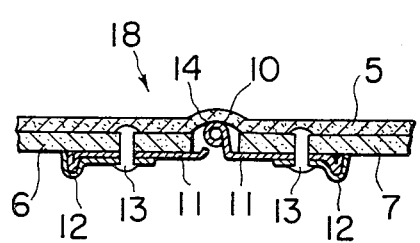
FIG. 4 is an enlarged perspective view of the portion of the holdable panel defined within the circle IV of FIG. 1.
Figure 5:
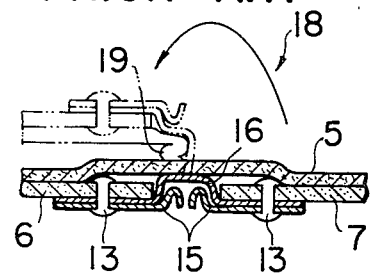
FIG. 5 is a view similar to FIG. 4, and which shows another construction of the corresponding portion of the foldable panel.

This problem can be best understood from FIGS. 4 and 5 which shows the construction of the hinge members used to interconnect the front and rear plates constituting the foldable panel. Thus let us look specifically to FIG. 4 wherein the numeral 18 generally denotes the foldable panel according to the first prior art. As shown the panel consists of a forward plate 6 and a rear plate 7. Extending continuously across the upper surfaces of the plates is a flexible and decorative cover member or outer layer 5. The hinge of well known construction consists of two hinge plates 11, 11 which along with reinforcing members 12, 12 are fastened to the plates 6 and 7 via suitable fastening means which in this case take the form of rivets 13, 13. The hinge plates 11, 11 are curled at the ends 14, 14 and suitably castled for pivotal interconnection via a hinge pin 10.

As shown the provision of the curled portions 14, 14 and the hinge pin between the edges of the plates 6 and 7 tends to produce an unwanted bulge across the panel and when the panel is folded in two interrupts smooth folding. A detailed explanation of this drawback will be given in connection with FIG. 5.

Looking now to FIG. 5 we find a hinge arrangement according to the prior art. In this arrangement the rigid hinge of the FIG. 4 arrangement is replaced with a flexible type which takes the form of a strap 16 made of leather or other suitable flexible material. In this case the reinforcing members 15, 15, are formed so as to have ends which are curled and juxtaposed to limit the travel of the plates 6 and 7 toward each other. As before, rivets 13, 13 fasten the strap 16 and reinforcing members 15, 15 to the plates 6 and 7.

The fully folded arrangement of the panel described immediately above is shown in phantom. As can be seen, due to the provision of the strap (hinge) the outer layer 5 is prevented from smoothly folding inducing the illustrated tendency to double fold or wrinkle. This wrinkling of course induces stresses within the material constituting the outer layer 5 greatly speeding the time when failure of that portion will occur. Deterioration of the appearance of the panel is inevitable and/or leads to rippling of the outer layer upon the sliding of luggage thereover. Furthermore prior to actual failure, permanent creases are apt to appear.

The arrangement of FIG. 5 tends to bulge at the location of the hinge similarly to the FIG. 4 arrangement and likewise tends to undergo more severe abrasion than the remaining surface area of the outer layer 5.

With the arrangement, as shown in FIG. 4 or FIG. 5, which tends to bulge at the location of the hinge, the outer layer will not extend in a plane upon unfolding of the shelf so that an article or luggage supported thereon might be tilted.

SUMMARY OF THE PRESENT INVENTION

The present invention overcomes the drawbacks of the prior art by interconnecting the front and rear plates constituting the panel or shelf via generally "U" shaped members having parallel spindles which allow upon folding of the shelf or panel, the outer layer to fold into position wherein a single unstressed smooth fold is created.

More specifically the present invention provides a panel for the storage area or luggage compartment of an automobile having a panel supporting structure, the panel comprising: an outer layer, a first plate and a second plate which are covered by said outer layer and which have inboard edges spaced from each other; a hinge to join said first and second plates, said hinge including a generally "U" shaped member having a first spindle and a second spindle, said first spindle being rotatable received by said first plate and said second spindle being rotatably received by said second plate.

The prime object of the present invention is therefore to provide a foldable panel or shelf which has a hinge arrangement permitting the outer layer of the panel to fold smoothly and without stress to prolong the longevity thereof and which permits the panel to unfold so that the outer layer is bulge-free and flat.

DETAILED DESCRIPTION OF THE PREFERRED EMBODIMENT

Figure 6:
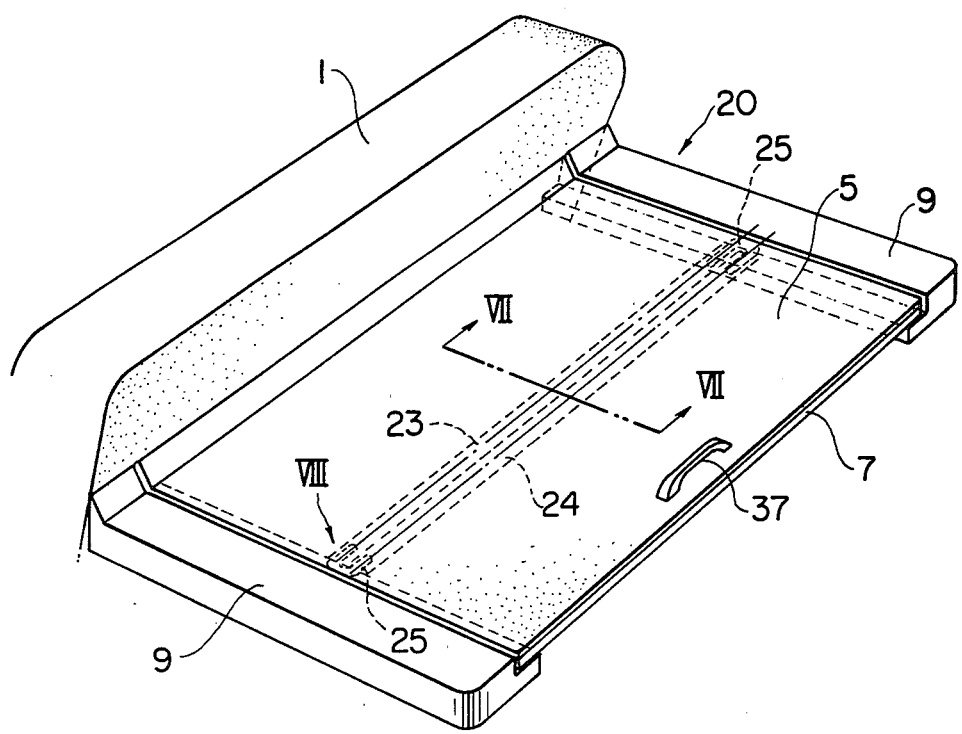
FIG. 6 is a perspective view similar to that of FIG. 3 but showing the preferred embodiment of the present invention.

The construction of the preferred embodiment can best be seen from FIGS. 6 and 7 wherein the same numerals as used in connection with FIGS. 1 to 5 are used to denote corresponding parts.

Looking now specifically to FIG. 7 the numerals 6 and 7 denote front and rear plates which are provided with reinforcing members 23, 24 which are formed with cylindrical envelopes 26 and 27 respectively. In this case the reinforcing members also serve as part of the hinge thus enabling a reduction in weight and number of parts. As shown the reinforcing members are fastened to the edges 21, 22 of the plates 6 and 7 via suitable means such as the illustrated rivets 13, 13. The upper portions of the envelopes are arranged to be substantially flat and parallel with the upper surfaces of the respective plates.

Figure 1:
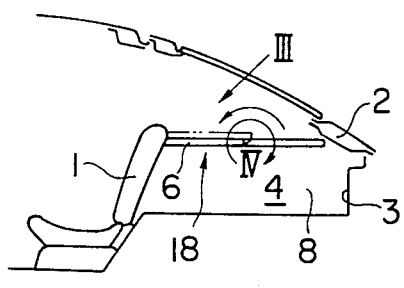
FIG. 1 is a schematic longitudinal sectional view of a vehicle provided with a conventional foldable panel which acts as a partition and shelf for the luggage compartment.
Figure 2:
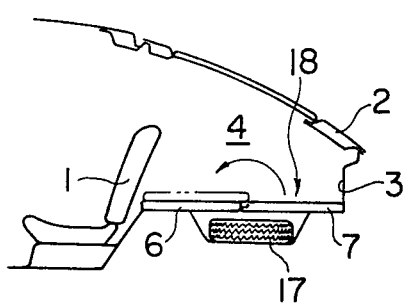
FIG. 2 is a schematic longitudinal sectional view of a vehicle provided with a similar conventional foldable panel which acts as a floor cover for the luggage compartment.
Figure 3:
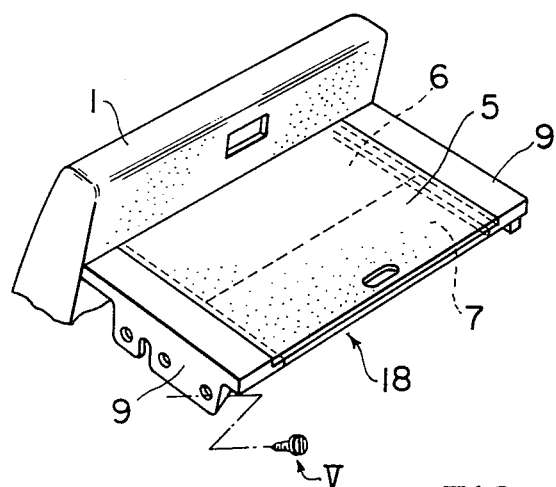
FIG. 3 is a perspective view as seen in the direction of arrow III of FIG. 1.

A generally "U" shaped pin 25 which can be best seen in FIG. 8 has two spindles 38 and 39 which are respectively received in the cylindrical envelopes 26, 27. In this case the pin 25 is also formed with a third spindle or pivot 32 the axis 32' of which is aligned with the axis 38' of the spindle 38. It is however to be noted that this third spindle can be omitted should the situation permit or demand it. For example should the preferred embodiment be used as a floor cover such as depicted in FIG. 2 of the drawings the simple provision of a suitable recess, for the panel, in the floor pan would suffice.

Upon insertion of the pin 25 into the envelopes 26, 27 the situation depicted in FIG. 7 will occur wherein the coincident axes 28 and 38' and 29 and 39' of the cylindrical envelopes 26, 27 and the spindles 38, 39 will be spaced by a distance a which according to the preferred embodiment is greater than twice the shortest distance b defined between the surface of the outer layer and either of the axes 28, 29.

Furthermore the portion of the pin 25 interconnecting the spindles 38, 39 is such that the upper surface when in the inserted position as indicated by broken line in FIG. 8 is such as to be substantially parallel with the upper surfaces of the plates 6, 7 when the latter are in the unfolded position. This is of course to add support to the lower surface of the outer layer 5.

The fully folded position of the panel is shown in FIG. 7 in phantom. As seen from the drawing the outer layer 5 is folded in half without encountering the hinge pins and undergoing undesired multiple folding. The reason for this is that upon lifting of the plate 7 in the direction of the arrow to open the luggage compartment or expose the spare tire, pivotal movement occurs about the spindles 39 (it being appreciated from FIG. 6 that there are two hinge pins 25 located on either side of the foldable panel) whereupon the upper layer 5 be flexed to assume a generally "L" shaped configuration. At this time the hinge pins themselves will begin to pivot and upon the panel reaching the fully folded position will have rotated through 90 degrees to assume the illustrated position. This of course means that the outer layer 5 will continue to be smoothly bent from the "L" shaped position to the illustrated position without undergoing multiple folding.

Figure 9:
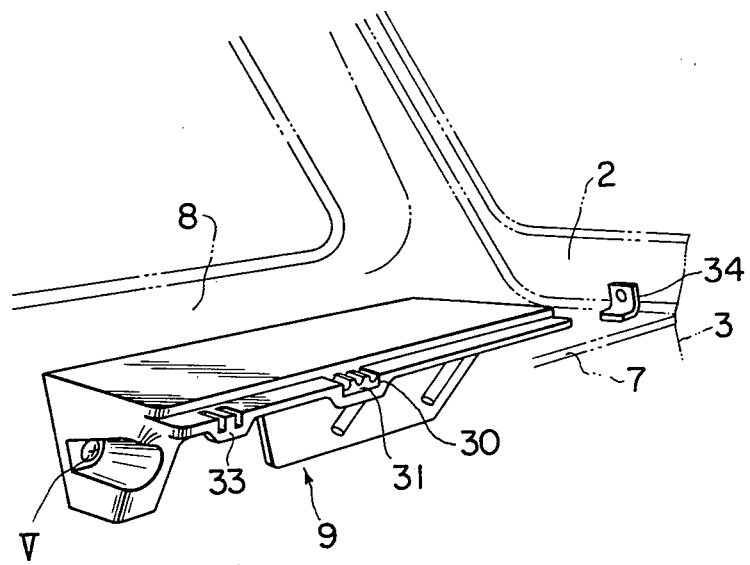
FIG. 9 is a perspective view of a supporting frame for the foldable panel shown in FIG. 6.

FIG. 9 illustrates a supporting frame 9 (one of two) which cooperates with the foldable panel. This frame is provided with a holder 31 for receiving the third spindle 32 of the hinge pin 25. Located forward of the holder 31 is a catch 33 which may take the form of a magnet which in turn cooperates with a metal plate, by way of example, provided to the side edge of the plate 6. The purpose of this catch, is of course, to prevent rattling of the front plate 6 during movement of the vehicle. A retainer 34 is provided on the tail gate 2 of the vehicle which rests on the upper surface of the upper layer when the tail gate is closed and which moves with the tail gate to permit ready lifing of the rear plate via the use of handle or grip 38 (see FIG. 6) from outside the vehicle with the tail gate open.

Figure 10:
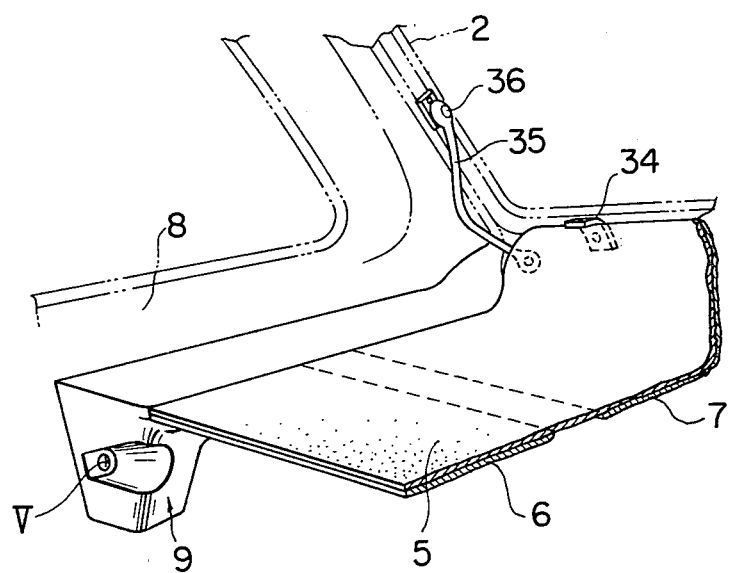
FIG. 10 is a perspective view of a second embodiment of the present invention.

FIG. 10 shows a further possible arrangement of the retainer 34. In this case rather than being connected to the tail gate it is fastened to a rear end panel 3 of the vehicle body and arranged to extend over the upper edge of the rear plate 7 to secure same in position. The arrangement also features a flexible connector 35 which interconnects the end corner of the rear plate 7 with a suitable part of the tail gate. Thus when the tail gate is opened the rear half of the foldable panel is lifted therewith.

In order to permit full folding of this arrangement a hook member 36 is provided which permits the flexible connector 35 to disconnect from the tail gate 2.

The frames 9 of both FIGS. 9 and 10 are suitably fastened to the side panels of the vehicle via means such as screws V (only one being illustrated).

Thus with the present invention it will be appreciated that the number of parts required to assemble the foldable panel is reduced, the life of the outer layer is extended because of the smooth single fold which occurs each time the shelf or panel is opened and/or folded and because the panel can assume a completely flat configuration at the area of the panel hinges.

What is claimed is:

1. A foldable panel for the storage area of an automotive vehicle having a panel supporting structure, comprising:
    an outer layer;
    a first plate and a second plate which are covered by said outer layer and which have inboard edges spaced from each other;
    a generally "U"-shaped member having integral first and second spindles, said first spindle being rotatably connected to said first plate and said second spindle being rotatably connected to said second plate, first and second reinforcement members secured to said first and second plates, respectively, at portions adjacent said inboard edges, said reinforcement members being formed with envelope sections, respectively, for receiving said first and second spindles, respectively, the distance between the axis of said first spindle and the axis of said second spindle being greater than the sum of the distances between the axis of said first spindle and the upper surface of said outer layer and between the axis of said second spindle and said upper surface of said outer layer.

2. A panel as claimed in claim 1, wherein said generally U-shaped member has a pivot for pivotally mounting the panel in a support holder disposed on said panel supporting structure, said pivot being axially aligned with one of said first and second spindles.

3. An automotive vehicle incorporating the panel as claimed in claim 2, wherein said panel supporting structure has a catch adjacent an inboard edge thereof, and said first plate of said panel is provided with a member which cooperates with said catch to hold said first plate to said panel supporting structure.

4. An automotive vehicle incorporating the panel as claimed in claim 1, including a flexible connector having one end connected to said second plate adjacent the outboard edge thereof and a hook for connecting the other end of said flexible connector to a tail gate of said vehicle so that lifting said tail gate lifts said second plate.

5. In a vehicle having a structural panel and a storage area,
- a foldable panel which acts as shelf and/or partition for said storage area, comprising:
- first and second rigid panels having upper surfaces;
- a U-shaped member which has a first integral arm thereof rotatably connected to said first panel by a first reinforcement member formed with an envelope which receives said first arm therein and a second integral arm thereof rotatably connected to said second panel by a second reinforcement member formed with an envelope which receives said second arm therein, the base of said U-shaped member being adapted to rest on said structural panel of the vehicle; and
- a flexible decorative cover disposed over both of the upper surfaces of said first and second panels.

* * * * *